US007222640B2

(12) United States Patent
Gadd

(10) Patent No.: US 7,222,640 B2
(45) Date of Patent: May 29, 2007

(54) SWITCHING FLUID FLOW BY DIVERSION

(75) Inventor: Michael William Gadd, Singapore (SG)

(73) Assignee: Jetsis International, Pte Ltd., Singapore (SG)

( * ) Notice: Subject to any disclaimer, the term of this patent is extended or adjusted under 35 U.S.C. 154(b) by 50 days.

(21) Appl. No.: 10/550,979

(22) PCT Filed: Mar. 30, 2004

(86) PCT No.: PCT/SG2004/000073

§ 371 (c)(1),
(2), (4) Date: Sep. 26, 2005

(87) PCT Pub. No.: WO2004/087378

PCT Pub. Date: Oct. 14, 2004

(65) Prior Publication Data

US 2007/0028972 A1    Feb. 8, 2007

(30) Foreign Application Priority Data

Apr. 2, 2003    (SG) .............................. 200301765

(51) Int. Cl.
*F16K 11/06* (2006.01)
(52) U.S. Cl. .................. 137/625.46; 451/101
(58) Field of Classification Search ........... 137/625.46; 451/101
See application file for complete search history.

(56) References Cited

U.S. PATENT DOCUMENTS

| 3,116,757 | A | * | 1/1964 | Donguy et al. | ........ 137/625.11 |
| 4,632,148 | A | * | 12/1986 | Stark et al. | ............ 137/624.18 |
| 4,936,059 | A | * | 6/1990 | Hashish et al. | ................ 451/99 |
| 5,582,206 | A | * | 12/1996 | Brillant | .................. 137/625.21 |
| 5,694,967 | A | * | 12/1997 | Schultz | .................. 137/118.02 |

FOREIGN PATENT DOCUMENTS

| GB | 2 232 620 A | 12/1990 |
| WO | 02/087827 A1 | 11/2002 |
| WO | 2004/087378 A1 | 10/2004 |

* cited by examiner

*Primary Examiner*—John Fox
(74) *Attorney, Agent, or Firm*—Ohlandt, Greeley, Ruggiero & Perle, L.L.P.

(57) ABSTRACT

A flow of fluid is switched on and off by diverting the flow to an alternative path. In a preferred application an abrasive cutting jet, formed by a flow of abrasive slurry fed via a conduit to a cutting jet nozzle, is switched on and off by diverting the flow at a three way changeover valve to a conduit and bypass nozzle. Valves control the connection to a flow of clean auxiliary water to respective outlet ports of the changeover valve to reduce pressure differentials during operation of the changeover valve and to provide clean backflows which hydraulically divert the flow of abrasive slurry at the changeover valve and allow the changeover valve to open and close on a clean, largely abrasive-free flow.

21 Claims, 2 Drawing Sheets

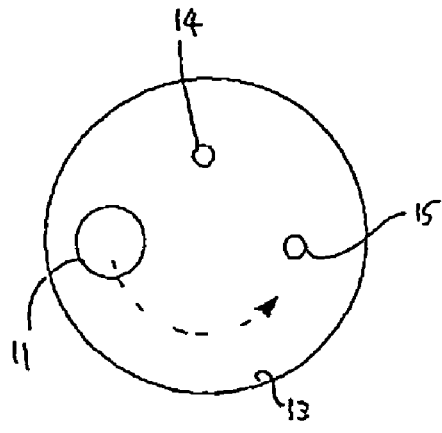
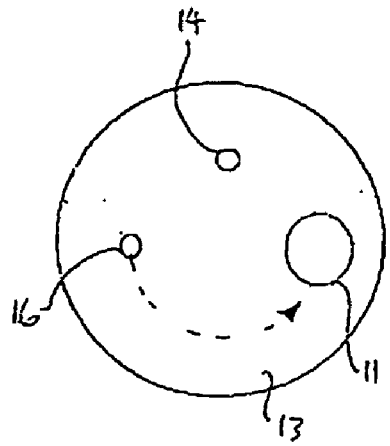
FIGURE 2  FIGURE 3
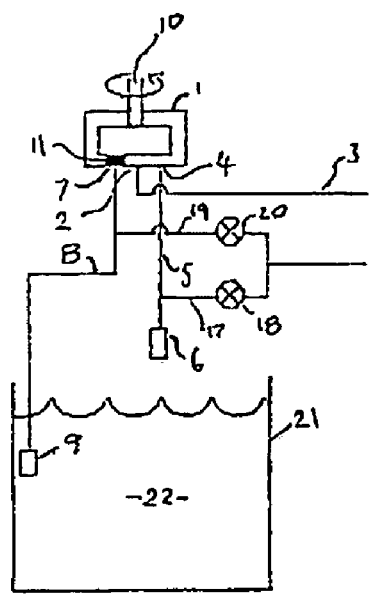
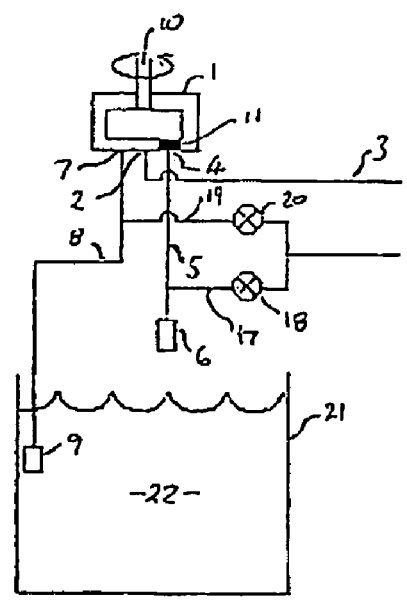
FIGURE 4  FIGURE 5

SWITCHING FLUID FLOW BY DIVERSION

FIELD OF INVENTION

The present invention relates to arrangements and methods for the control of a fluid flow. More particularly, but not exclusively, it relates to the switching, or start/stop control, of a flow of a pressurised carrier fluid in which abrasive particles are suspended. One application of the invention is in the control of an abrasive cutting jet formed by suspending abrasive particles in a fluid, such as water, which is then applied at high pressure to a nozzle to form the cutting jet.

BACKGROUND

The invention has application to the control of fluid flow and particularly the control of fluids containing abrasive material which can cause blockages and undesirable wear and erosion of control valve parts.

The use of abrasive materials in a fluid jet is well known, for example for machining operations such as cutting, drilling and surface finishing. In one known arrangement, a high pressure carrier fluid, for example water, is pumped into a vessel containing a slurry of abrasive particles to force a mixture of the carrier fluid and abrasive particles through a nozzle which forms a well-defined abrasive jet.

Various applications require the jet, or at least the abrasive content in the jet, to be repeatedly switched on and off. For example, in the sequential drilling of multiple holes the jet, or at least the abrasive content in the jet, is switched off during repositioning of the nozzle over the work piece and then switched on again to drill the next hole.

It is not practical to achieve this by simply repeatedly switching the high pressure pump on and off. The time taken for the alternating depressurisation and repressurisation of the abrasive slurry vessel delays the cessation and re-establishment of the abrasive flow at the jet and limits the jet switching frequency.

Also, when the fluid flow is halted the abrasive particles, which are suspended in the moving flow, can settle and cause blockages, for example in the flow conduits and nozzle. These blockages prevent the easy re-establishment of the abrasive fluid flow and can cause excessive down time while parts are de-pressurised, dissassembled, flushed to clear the blockages, re-assembled and re-pressurised. When the outlet nozzle is blocked, the pressure vessel through which the flow is passed to entrain the abrasive particles must be depressurised through an alternative route, usually a valve connected to the pressure vessel. This valve is subject to a high degree of wear because it is exposed to the full pressure differential across its seat as it opens and because small fines of abrasive from the vessel can pass through the valve.

Furthermore, the use of valves to control the abrasive flow is difficult due to the abrasive nature of the fluid which causes excessive valve wear. Present valves are not entirely suitable for opening and closing against a high-pressure abrasive flow, or for maintaining a pressure differential across the valve during the opening and closing operations.

One prior art two way wiping action valve operates with slurries at low pressures for turning a 'mostly' abrasive-free water jet on and off. This type of valve is self-lapping so that as it wears it continues to maintain a seal. However, when controlling high pressure abrasive flows, the valve will quickly become damaged as it nears closing because the high pressure abrasive slurry discharging through the reducing gap will erode the valve.

This latter problem is addressed in the prior art WO 99/14015 and WO 02/087827 which describe the use of small diameter flow outlets to cope with the large pressure differentials, and a controlled jet pump to ensure the flow is relatively abrasive free before actuating the valve. This valve design relies on halting the abrasive flow then shutting the jet, and flow, off completely. For abrasive suspension jets pressurised by piston pumps, stopping and starting the flow is a problem, as is the resultant clogging of the abrasive material in the conduits or hoses if the flow is halted. Furthermore, the small diameter valve outlets make this arrangement unsuitable for larger flow requirements.

SUMMARY OF INVENTION

It is an object of one embodiment of the invention to provide a fluid flow control arrangement which reduces at least some of the problems associated with the prior art.

It is an object of a second embodiment of the invention to provide a method of controlling the flow of a fluid which method reduces at least some of the problems associated with the prior art.

In broad terms a first aspect of the invention may be said to be a method of controlling a fluid flow by a three way valve having;

(a) an inlet port, (b) first and second outlet ports, (c) a first configuration in which the valve substantially provides a path for fluid flow between the inlet port and the first outlet port but not between the inlet port and the second outlet port, (d) a second intermediate configuration in which the valve provides respective paths for fluid flow between the inlet port and each of the first and second outlet ports; and (e) a third configuration in which the valve substantially provides a path for fluid flow between the inlet port and the second outlet port but not between the inlet port and the first outlet port, the method including the following steps performed sequentially in the order (f) to (l);

(f) connecting the inlet port of the three way valve to a source of primary fluid at a first pressure and configuring the three way valve in the first configuration to permit the primary fluid to flow into the inlet port, through the three way valve and out from the first outlet port, (g) connecting a supply of auxiliary fluid at a second pressure to the second outlet port, (h) configuring the three way valve in the second intermediate configuration, (i) discontinuing said supply of auxiliary fluid connected to said second outlet port and connecting a supply of auxiliary fluid at a third pressure to the first outlet port, (j) permitting the primary fluid to flow into the inlet port, through the three way valve and out from the second outlet port, (k) preventing the flow of primary fluid out from the first outlet port by configuring the three way valve in the third configuration, and (l) discontinuing said supply of auxiliary fluid connected to said first outlet port, wherein the second and third pressures are higher than the first pressure, and the primary fluid flow into the inlet port, through the three way valve and out from at least one of the outlet ports is substantially continuously maintained during performance of the above-mentioned steps.

In a second aspect, the invention may be broadly said to be a method of diverting a flow of primary fluid flowing into an inlet port of a three way valve and initially discharging from a first outlet port of the three way valve to divert and discharge from a second outlet port of the three way valve while maintaining a continuous flow of said primary fluid into the inlet port, the method including the following steps performed sequentially in the order (a) to (f);

(a) connecting the inlet port of the three way valve to a source of the primary fluid at a first pressure and configuring the three way valve by opening the first outlet port and closing the second outlet port to permit the primary fluid to flow into the inlet port, through the three way valve and out from the first outlet port, (b) connecting a supply of auxiliary fluid at a second pressure to the second outlet port, (c) configuring the three way valve by opening both outlet ports to permit the primary fluid flowing into the inlet port to flow out of either outlet port, (d) discontinuing said supply of auxiliary fluid connected to said second outlet port and connecting a supply of auxiliary fluid at a third pressure to the first outlet port thereby diverting the flow of primary fluid initially flowing into the inlet port, through the three way valve and out from the first outlet port to instead flow out from the second outlet port, (e) preventing further flow of primary fluid out from the first outlet port by closing the first outlet port, (f) discontinuing said supply of auxiliary fluid connected to said first outlet port, wherein the second and third pressures are higher than the first pressure, and the primary fluid flow into the inlet port, through the three way valve and out from at least one of the outlet ports is substantially continuously maintained during performance of the above-mentioned steps.

In a third aspect, the invention may be broadly said to be a valve arrangement for controlling the flow of a fluid, the valve arrangement including:

a three way valve (1) having;

(a) an inlet port (2) being connectable to a source of primary fluid at a first pressure, (b) first and second outlet ports (4, 7), (c) a first configuration in which the valve substantially provides a path for fluid flow between the inlet port (2) and the first outlet port (4) but not between the inlet port and the second outlet port (7), (d) a second intermediate configuration in which the valve provides respective paths for fluid flow between the inlet port and each of the first and second outlet ports; and (e) a third configuration in which the valve substantially provides a path for fluid flow between the inlet port and the second outlet port but not between the inlet port and the first outlet port, the valve arrangement also including:

(f) a first fluid flow conduit (17) connected to the first outlet port, the first conduit having a first auxiliary valve (18) for controlling the flow of an auxiliary fluid at a second pressure to the first outlet port (4), (g) a second fluid flow conduit (19) connected to the second outlet port, the second conduit having a second auxiliary valve (20) for controlling the flow of an auxiliary fluid at a third pressure to the second outlet port (7), and (h) a valve controller which controls the three way valve and the first and second auxiliary valves, the valve controller being adapted to:

(i) sequentially change the three way valve from the first configuration to the second intermediate configuration and then to the third configuration, (j) maintain the first auxiliary valve closed and the second auxiliary valve open at least immediately prior to and during the change of the configuration of the three way valve from the first to the second configurations, (k) open the first auxiliary valve and close the second auxiliary valve when the valve is in the second intermediate configuration, (l) maintain the second auxiliary valve closed and the first auxiliary valve open during the change of the configuration of the three way valve from the second intermediate configuration to the third configuration; and (m) close both first and second auxiliary valves after the three way valve has been changed to the third configuration.

The first, second and third aspects of the invention may include the following options.

The primary fluid may include an abrasive material entrained in a carrier fluid.

The primary fluid may include abrasive particles entrained in a carrier liquid.

The carrier liquid may be water.

The auxiliary fluids may be water.

A nozzle may be connected to one of the outlet ports for forming the primary fluid flowing therefrom into a jet.

Optionally, the primary fluid includes abrasive particles entrained in a carrier liquid and the nozzle is for forming an abrasive jet.

A second nozzle may be connected to the other of said outlet ports.

The three way valve may be a rotary valve.

The rotary valve may utilise a rotary wiping action with a self-lapping flat valve seat.

The invention may further be said to consist in any alternative combination of parts or features mentioned herein or shown in the accompanying drawings. Known equivalents of these parts or features which are not expressly set out are nevertheless deemed to be included.

BRIEF DESCRIPTION OF DRAWINGS

A preferred embodiment and methods of the invention will be further described with reference to the accompanying figures by way of example only and without intending to be limiting, wherein;

FIG. 2 shows an axial plan view of a valve plate and seat of the rotary valve of FIG. 1, in one configuration, FIG. 3 shows an axial plan view of the valve plate and seat of the rotary valve of FIGS. 1 and 2, in an alternative configuration, FIG. 4 shows a schematic layout of parts of the abrasive cutting jet apparatus in one mode, and FIG. 5 shows a schematic layout of parts of the abrasive cutting jet apparatus in an alternative mode.

DETAILED DESCRIPTION OF A PREFERRED EMBODIMENT

Figure 1:
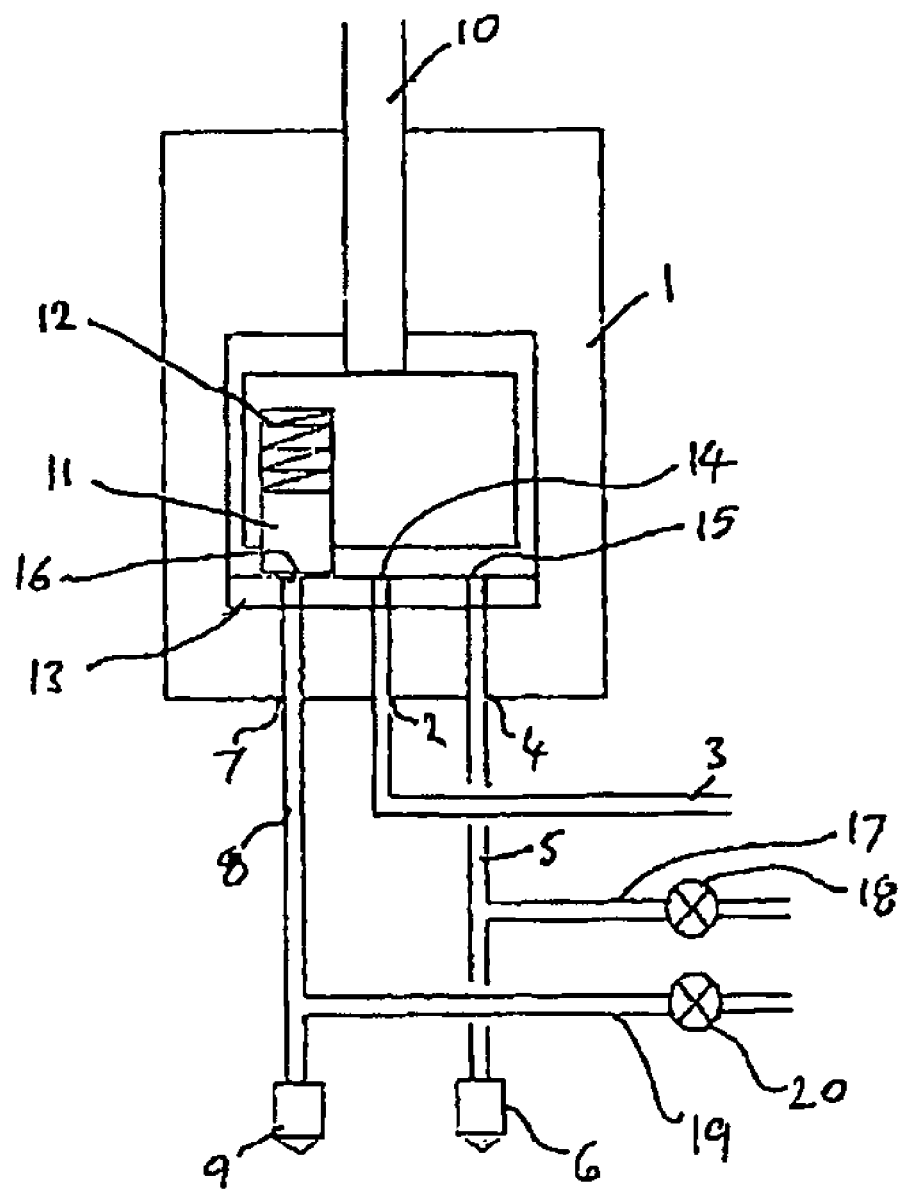
FIG. 1 shows a portion of an abrasive cutting jet apparatus including a rotary valve.

Referring to the figures it will be appreciated that the invention may be implemented in various forms and modes. The following description of an embodiment and methods are given by way of example only.

FIG. 1 shows an arrangement of valves for controlling the flow of an abrasive fluid to a cutting nozzle in an abrasive cutting jet apparatus. The arrangement includes a three way rotary valve 1 having an inlet port 2 which is to be connected via an inlet conduit 3 to a source (not shown) of primary fluid at a high pressure. The primary fluid may be a liquid or gas, but in one preferred application is typically water in which abrasive particles are entrained.

The three way valve 1 also has a cutting flow outlet port 4 which connects via a cutting flow conduit 5 to a cutting nozzle 6, and a bypass flow outlet port 7 which connects via an bypass flow conduit 8 to a bypass nozzle 9. The three way valve has control shaft 10 and rotor by which a valve seat 11 is rotated. The valve seat is biased by a spring 12 toward a valve plate 13 which is provided with three apertures which correspond to the three valve ports: a central inlet port aperture 14 and, radially outward from the central aperture, two circumferentially spaced outlet port apertures being a cutting flow outlet aperture 15 and a bypass flow outlet aperture 16.

The control shaft 10 and rotor of the three way valve can be rotated to move the valve seat 11 over the apertured valve plate 13 between two configurations, as may be best appreciated by the axial plan views shown in FIGS. 2 and 3.

The three way valve is a high pressure rotary valve using a wiping action with self-lapping flat valve seats. Although in general such a valve can only operate with a small pressure differential across its faces, this problem has been overcome by momentarily providing a backpressure to a valve outlet just as that outlet is being opened, as will be discussed further below.

FIGS. 1, 2 and 4 show the apparatus with the three way valve 1 in a cutting configuration in which the valve seat 11 occludes the bypass flow outlet aperture 16, while providing a path for the primary fluid to flow between the inlet port 2 and the cutting flow outlet port 4, which leads to the cutting nozzle 6.

FIGS. 3 and 5 show the apparatus with the three way valve 1 in a bypass configuration in which the valve seat 11 occludes the cutting flow outlet aperture 15, while providing a path for the primary fluid to flow between the inlet port 2 and the bypass flow outlet port 7.

When changing between the cutting and bypass configurations discussed above, the three way valve passes through an intermediate or changeover configuration (not shown). In the intermediate configuration, both of the outlet port apertures 15, 16 are open to provide respective paths for primary fluid to flow between the inlet port 2 and each of the outlet ports 4, 7; i.e. the outlet ports leading to both the cutting nozzle 6 and the bypass nozzle 9.

As may be best appreciated from FIG. 1, a source (not shown) of high pressure auxiliary fluid, which in the preferred application is clean water, is connected to the cutting flow conduit 5 via a pressurisation conduit 17. The cutting flow pressurisation conduit 17 includes a pressurisation control valve 18. A source of high pressure auxiliary fluid (not shown), which in the preferred application is clean water and is typically the same clean water supply connected via pressurisation conduit 17, is connected to the bypass flow conduit 8 via a pressurisation conduit 19. The bypass flow pressurisation conduit 19 includes a pressurisation control valve 20.

As will be explained further below, the flow of the primary fluid from the cutting nozzle may be stopped by diverting the primary fluid flow to discharge instead from the bypass nozzle. Similarly, the flow from the cutting nozzle may be re-established by re-diverting the flow back to the cutting nozzle. This switching of the flow of primary fluid from the cutting nozzle may be accomplished without halting the flow of primary fluid through the apparatus.

The switching of the flow of fluid from the cutting nozzle is controlled by a controller (not shown) which sequentially changes the states of the three way valve 1 and the two pressurisation valves 18, 20 to divert the flow of primary fluid back and forth between the cutting and bypass nozzles.

The sequence of valve operation will be further explained by reference to FIGS. 4 and 5 which show the abrasive jet cutting apparatus arranged over a catch tank 21. An abrasive-laden slurry is discharged as a defined jet (not shown) from the cutting nozzle 6 and directed at a workpiece (not shown) to perform a Cutting or drilling operation, after which the spent slurry is collected in the catch tank. The bypass nozzle 9 is placed in the catch tank so that when the abrasive liquid flow is diverted from the cutting jet to discharge from the bypass nozzle, the discharged bypass liquid combines with the spent cutting liquid in the catch tank from where it can be re-cycled.

In the arrangement shown in FIG. 4, a flow of high pressure water, in which abrasive particles are entrained, is fed via inlet conduit 3 to the inlet port 2 of the three way valve 1. The pressurisation conduits 17, 19 both connect to a high pressure source of clean water. The pressurisation valves 18, 20 (in respective pressurisation conduits 17, 19) are both closed.

As shown in FIGS. 2 and 4, the valve seat 11 of the three way valve 1 occludes the bypass flow outlet port 7 so that no abrasive-laden water flows to the bypass nozzle 6. The presence within the three way valve of the high pressure abrasive-laden water and the absence of any significant pressure in the bypass flow conduit 8 provides a pressure differential which augments the sealing of the valve seat 11 over the valve plate aperture 16 at the bypass flow outlet port 7. The abrasive-laden water flows through the three way valve, via open cutting flow outlet port 4 and the cutting flow conduit 5, to discharge as an abrasive jet from the cutting nozzle 6. There is no discharge from the bypass nozzle.

When the cutting jet is to be stopped, bypass flow pressurisation valve 20 is opened to pressurise bypass flow pressurisation conduit 19 with clean water which then discharges from bypass nozzle and applies back pressure to the bypass flow outlet port 7 of the three way valve, reducing the aforementioned pressure differential. This reduction in pressure differential allows the valve seat to be easily moved. Without this back pressure, operation of the three way valve would be difficult, if not impossible, and if possible would require a very large force and would be likely to cause excessive valve wear.

The pressure of the clean auxiliary water supply is slightly higher than that of the abrasive-laden liquid supplied via the inlet conduit 3 to the three way valve. In one arrangement (not shown), this clean auxiliary water and the carrier water for the abrasive-laden water are initially derived from the same high pressure water supply, but the pressure of the clean auxiliary water is slightly higher that that of the abrasive-laden water at the inlet port of the three way valve.

The less-direct passage that the carrier water must take, e.g. through a slurry vessel for the entrainment of abrasive particles in the carrier water, reduces the pressure of this flow before it reaches the inlet of the three way valve.

The seat 11 of the rotary three way valve is then moved to an intermediate position (not shown) between the outlet ports, in which position both the bypass flow outlet port 7 and the cutting flow outlet port 4 are open.

As the bypass flow outlet port 7 of the three way valve 1 opens, the slightly higher pressure of the clean auxiliary water applied to the bypass flow conduit 8 via pressurisation conduit 19 causes a small back flow of the clean water to flow into the bypass flow outlet port 7 to join with the abrasive-laden water flowing out from the cutting flow outlet port 4. This back flow allows the bypass flow outlet port 7 to open in the absence of any significant abrasive flow therethrough, while at the same time maintaining the flow of the abrasive-laden water through the already-open cutting flow outlet port 4 to discharge as the jet at the cutting nozzle 6.

When the seat 11 of the three way valve 1 is at the intermediate position (i.e. both the cutting and bypass flow outlet ports 4, 7 are open), the pressurisation valve 20 is changed from open to closed and the pressurisation valve 18 is changed from closed to opened.

The higher pressure of the clean auxiliary water now applied to the cutting flow conduit 5 via pressurisation conduit 17 causes clean water to discharge via the cutting nozzle 6 and a small back flow of the clean water to flow into the cutting flow outlet port 4. The switching of the pressurised clean water from the bypass flow conduit 8 to the cutting flow conduit 5, in effect, switches the backflow of clean water at the three way valve from the bypass flow outlet port 7 to the cutting flow outlet port 4. This switch of the backflows hydraulically shifts the flow of abrasive-laden water, previously exiting the three way valve at the cutting flow outlet port 4, to divert to exit at the bypass flow outlet port 7 and to discharge into the catch tank 21 via the bypass nozzle 9.

The backflow of clean auxiliary water into the cutting flow outlet port 4 joins with the abrasive-laden water flowing from the bypass flow outlet port 7. This back flow also allows the cutting flow outlet port 4 to close (as will be explained further below) in the absence of any significant abrasive flow, while maintaining the flow of the abrasive-laden water through the already-open bypass flow outlet port 7 to discharge into the catch tank 21 at the bypass nozzle 9.

It will be appreciated that the diversion of the abrasive-laden water flow is accomplished hydraulically by the selective application of back flows of clean auxiliary water at a slightly higher pressure than that of the primary abrasive-laden water flow. The changeover of the abrasive flow is accomplished while both of the outlet ports of the three way valve are open, largely avoiding the significant erosion or wear that would otherwise occur if any valve part had to close or open on a high pressure abrasive flow.

The application to the outlet ports of the three way valve of the back pressure provided by the auxiliary water during the times that the three way valve is to be operated also reduces the large pressure differentials which would otherwise preclude easy operation of the rotary valve.

It is also to be understood that control of the pressurisation valves effectively switches the abrasive fluid flow in the three way valve. This switching of the abrasive flow is achieved hydraulically by switching the application of the pressurized auxiliary flow between the cutting and bypass outlet flow conduits. The pressurisation valves open and close on the clean auxiliary water only and are therefore not subject to the abrasive primary flow, nor to any wear or erosion caused by that flow.

References herein to open valve ports or open valve apertures are to be understood, except where not appropriate, as including ports or apertures that are not fully closed, i.e. as including ports or apertures that are partly open, in addition to ports or apertures that are fully open.

To complete the diversion of the abrasive flow, the seat 11 of the three way valve 1 is now rotated from the intermediate position to occlude the cutting flow outlet port 4 as shown in FIGS. 3 and 5. This prevents any further flow of the abrasive-laden water to the cutting nozzle 9. The abrasive-laden water flows through the three way valve, via open bypass flow outlet port 7 and the bypass flow conduit 8, to discharge from the bypass nozzle 9.

After the valve seat 11 has closed the cutting flow outlet port 4, the pressurisation valve 18 is changed from open to closed to complete the switching off of the jet at the cutting nozzle 6 by diversion of the primary abrasive flow to discharge from the bypass nozzle 9.

To re-establish the cutting jet, the procedure described above is simply reversed. More particularly, the pressurisation valve 18 is opened, the three way valve is changed to the intermediate configuration, pressurisation valve 18 is shut and pressurisation valve 20 is opened, the configuration of the three way valve is changed to occlude the bypass flow outlet port 7, and the pressurisation valve 20 is closed.

When, as is the case in the preferred application, the primary fluid comprises abrasive particles entrained in a liquid, blockages can occur when the particles settle in a stationary or slow moving liquid, for example at the cutting nozzle or in the connecting conduits. The maintenance of a continuous flow ox the abrasive-laden fluid, as described above, reduces the likelihood of such blockages.

If the cutting nozzle 6 becomes blocked, the three way valve 1 can be actuated as described above, to close the cutting flow conduit 5 leading to the cutting nozzle and divert the abrasive flow to the bypass nozzle 9, before switching off the pump and allowing the system to depressurise naturally through the bypass nozzle.

This has the advantage that the abrasive slurry flow is not stopped completely when the nozzle blocks and the abrasive can be flushed clean from the three way valve 1, inlet conduit 3 and cutting flow conduit 5 before depressurising, whereas traditionally the abrasive lines would need to be unblocked after each blocked nozzle incident.

A pressure sensor may be used to determine when the cutting nozzle is blocked and to automatically actuate the flow diversion process to divert the abrasive flow to the bypass nozzle before shutting down the pump. The operator then only has to remove the nozzle and unblock and replace it.

It is to be understood that the flow diversion process described herein may be performed quickly, for example in only a few seconds: the first pressurisation valve opening only momentarily before rotation of the control shaft of the three way valve begins, the changeover of the pressurisation valves occurring while the three way valve rotor is traversing, midway between its two limits, and the final shut-off of the second pressurisation valve occurring immediately after the valve has completed its changeover.

High-speed drilling or piercing operations can be performed with an abrasive jet if the jet can be rapidly switched on and off. In prior art abrasive jet machining systems, the halting of the abrasive flow and depressurisation of the jet through the nozzle must be completed before the nozzle can be relocated for the next required hole position. This can typically take up to one minute for each relocation. Alternatively, the abrasive could be turned off, leaving a water jet still exiting the nozzle at high pressure. However, this alternative is only suitable for machining soft materials where the high pressure water jet is not likely to cause surface damage as it moves to the next position.

By diverting the abrasive flow as described herein, the whole jet exiting the nozzle is rapidly stopped while the pressurisation and flow of the abrasive fluid is maintained. With the current invention diversion of the jet flow, nozzle repositioning and jet flow re-establishment can take less than 3 seconds which allows high speed drilling operations to be carried out without risk of secondary surface damage.

In a further arrangement (not shown), die abrasive flow is switched between two or more cutting nozzles. Rather than using one cutting and one bypass nozzle as discussed above, two or more cutting nozzles are used. In this case the abrasive flow is switched to a selected cutting nozzle while the remaining nozzles can be re-positioned ready for the next machining operation.

The foregoing describes the invention including preferred forms thereof. Alterations and modifications as will be obvious to those skilled in the art are intended to be incorporated within the scope hereof as defined in the accompanying claims.

LIST OF FEATURES LABELLED IN THE FIGURES

1 Three way rotary valve
2 Inlet port
3 Inlet conduit
4 Cutting flow outlet port
5 Cutting flow conduit
6 Cutting nozzle
7 Bypass flow outlet port
8 Bypass flow conduit
9 Bypass nozzle
10 Control shaft
11 Valve seat
12 Valve spring
13 Valve plate
14 Inlet port aperture
15 Cutting flow outlet aperture
16 Bypass flow outlet aperture
17 Cutting flow pressurisation conduit
18 Pressurisation control valve
19 Bypass flow pressurisation conduit
20 Pressurisation control valve
21 Catch tank
22 Spent fluid

The invention claimed is:

1. A method of controlling a fluid flow by a three way valve having;
   (a) an inlet port,
   (b) first and second outlet ports,
   (c) a first configuration in which the valve substantially provides a path for fluid flow between the inlet port and the first outlet port but not between the inlet port and the second outlet port,
   (d) a second intermediate configuration in which the valve provides respective paths for fluid flow between the inlet port and each of the first and second outlet ports; and
   (e) a third configuration in which the valve substantially provides a path for fluid flow between the inlet port and the second outlet port but not between the inlet port and the first outlet port,
   the method including the following steps performed sequentially in the order (f) to (l);
   (f) connecting the inlet port of the three way valve to a source of primary fluid at a first pressure and configuring the three way valve in the first configuration to permit the primary fluid to flow into the inlet port, through the three way valve and out from the first outlet port,
   (g) connecting a supply of auxiliary fluid at a second pressure to the second outlet port,
   (h) configuring the three way valve in the second intermediate configuration,
   (i) discontinuing said supply of auxiliary fluid connected to said second outlet port and connecting a supply of auxiliary fluid at a third pressure to the first outlet port,
   (j) permitting the primary fluid to flow into the inlet port, through the three way valve and out from the second outlet port,
   (k) preventing the flow of primary fluid out from the first outlet port by configuring the three way valve in the third configuration, and
   (l) discontinuing said supply of auxiliary fluid connected to said first outlet port,
   wherein the second and third pressures are higher than the first pressure, and the primary fluid flow into the inlet port, through the three way valve and out from at least one of the outlet ports is substantially continuously maintained during performance of the above-mentioned steps.

2. A method of diverting a flow of primary fluid flowing into an inlet port of a three way valve and initially discharging from a first outlet port of the three way valve to divert and discharge from a second outlet port of the three way valve while maintaining a continues flow of said primary fluid into the inlet port, the method including the following steps performed sequentially in the order (a) to (f);
   (a) connecting the inlet port of the three way valve to a source of the primary fluid at a first pressure and configuring the three way valve by opening the first outlet port and closing the second outlet port to permit the primary fluid to flow into the inlet port, through the three way valve and out from the first outlet port,
   (b) connecting a supply of auxiliary fluid at a second pressure to the second outlet port,
   (c) configuring the three way valve by opening both outlet ports to permit the primary fluid flowing into the inlet port to flow out of either outlet port,
   (d) discontinuing said supply of auxiliary fluid connected to said second outlet port and connecting a supply of auxiliary fluid at a third pressure to the first outlet port thereby diverting the flow of primary fluid initially flowing into the inlet port, through the three way valve and out from the first outlet port to instead flow out from the second outlet port,
   (e) preventing further flow of primary fluid out from the first outlet port by closing the first outlet port,
   (f) discontinuing said supply of auxiliary fluid connected to said first outlet port, wherein the second and third pressures are higher than the first pressure, and the primary fluid flow into the inlet port, through the three way valve and out from at least one of the outlet ports is substantially continuously maintained during performance of the above-mentioned steps.

3. The method as claimed in claim 1, wherein the primary fluid includes an abrasive material entrained in a carrier fluid.

4. The method as claimed in claim 1, wherein the primary fluid includes abrasive particles entrained in a carrier liquid.

5. The method as claimed in claim 4 wherein the carrier liquid is water.

6. The method as claimed in claim 1, wherein the auxiliary fluids are water.

7. The method as claimed in claim 1, wherein a nozzle is connected to one of the outlet ports (4) for forming the primary fluid flowing therefrom into a jet.

8. The method as claimed in claim 7, wherein the primary fluid includes abrasive particles entrained in a carrier liquid and the nozzle is for forming an abrasive jet.

9. The method as claimed in claim 7, wherein a second nozzle is connected to the other of said outlet ports.

10. The method as claimed in claim 1, wherein the three way valve is a rotary valve.

11. The method as claimed in claim 10, wherein the rotary valve utilises a rotary wiping action with a self-lapping flat valve seat.

12. A valve arrangement for controlling the flow of a fluid, the valve arrangement including:
a three way valve having:
 (a) an inlet being connectable to a source of primary fluid at a first pressure,
 (b) first and second outlet ports,
 (c) a first configuration in which the valve substantially provides a path for fluid flow between the inlet port and the first outlet port but not between the inlet port and the second outlet port,
 (d) a second intermediate configuration in which the valve provides respective paths for fluid flow between the inlet port and each of the first and second outlet ports; and
 (e) a third configuration in which the valve substantially provides a path for fluid flow between the inlet port and the second outlet port but not between the inlet port and the first outlet port,
the valve arrangement also including:
 (f) a first fluid flow conduit connected to the first outlet port, the first conduit having a first auxiliary valve for controlling the flow of an auxiliary fluid at a second pressure to the first outlet,
 (g) a second fluid flow conduit connected to the second outlet port, the second conduit having a second auxiliary valve for controlling the flow of an auxiliary fluid at a third pressure to the second outlet port, and
 (h) a valve controller which controls the three way valve and the first and second auxiliary valves,
the valve controller being adapted to:
 (i) sequentially change the three way valve from the first configuration to the second intermediate configuration and then to the third configuration,
 (j) maintain the first auxiliary valve closed and the second auxiliary valve open at least immediately prior to and during the change of the configuration of the three way valve from the first to the second configurations,
 (k) open the first auxiliary valve and close the second auxiliary valve when the valve is in the second intermediate configuration,
 (l) maintain the second auxiliary valve closed and the first auxiliary valve open during the change of the configuration of the three way valve from the second intermediate configuration to the third configuration; and
 (m) close both first and second auxiliary valves after the three way valve has been changed to the third configuration.

13. The valve arrangement as claimed in claim 12, wherein the primary fluid includes an abrasive material entrained in a carrier fluid.

14. The valve arrangement as claimed in claim 12, wherein the primary fluid includes abrasive particles entrained in a carrier liquid.

15. The valve arrangement as claimed in claim 14 wherein the carrier liquid is water.

16. The valve arrangement as claimed in claim 12, wherein the auxiliary fluids are water.

17. The valve arrangement as claimed in claim 12, wherein a nozzle is connected to one of the outlet ports for forming the primary fluid flowing therefrom into a jet.

18. The valve arrangement as claimed in claim 17, wherein the primary fluid includes abrasive particles entrained in a carrier liquid and the nozzle is for forming an abrasive jet.

19. The valve arrangement as claimed in claim 17, wherein a second nozzle is connected to the other of said outlet ports.

20. The valve arrangement as claimed in claim 12, wherein the three way valve is a rotary valve.

21. The valve arrangement as claimed in claim 20, wherein the rotary valve utilises a rotary wiping action with a self-lapping flat valve seat.

* * * * *